Sept. 30, 1924.

E. E. WEMP 1,510,123

CLUTCH

Filed Aug. 15, 1921    2 Sheets-Sheet 1

INVENTOR.
Ernest E. Wemp
BY
Stuart C. Barnes
ATTORNEY.

Sept. 30, 1924.

E. E. WEMP

CLUTCH

Filed Aug. 15, 1921

INVENTOR.
Ernest E. Wemp
BY
Stuart C. Barnes
ATTORNEY.

Patented Sept. 30, 1924.

1,510,123

UNITED STATES PATENT OFFICE.

ERNEST E. WEMP, OF DETROIT, MICHIGAN.

CLUTCH.

Application filed August 15, 1921. Serial No. 492,276.

*To all whom it may concern:*

Be it known that I, ERNEST E. WEMP, a citizen of the United States, residing at Detroit, in the county of Wayne and State of Michigan, have invented certain new and useful Improvements in Clutches, of which the following is a specification.

This invention relates to clutches and has for its object a clutch acting on the direct spring pressure plan and which is cheap to manufacture and efficient in action. In my prior application #470,851 I have described a clutch that has a great many features embodied in the present clutch construction but which operates upon the principle of indirect spring pressure. The spring thrust is afforded by a single spring coiled about the driven shaft and the pressure of this thrust is multiplied when transmitted to the disks by means of levers afforded by a novel pressure disk which is a stamping.

The present application embodies the same construction and arrangement of disks but employs a direct spring pressure afforded by a number of springs in place of an indirect spring pressure afforded by a single thrusting spring. A thrust-transmitting disk almost identical with that shown in my previous application is used but instead of being used as a spring thrust transmitter it is used to transmit the thrust of the clutch collar for the purpose of releasing the clutch pressure. In my prior application I have claimed the novel features of this thrust disk so as to cover its use either as a spring thrust transmitter or to afford releasing leverage.

In the present application the claims are directed to a novel arrangement and construction which affords a clutch that has all the advantages of a direct spring pressure by a plurality of springs applied at numerous points around the clutch. Furthermore, the arrangement has considerable advantage from an economical and production standpoint.

In the drawings,—

*a* designates the driving shaft of an automobile, to which is bolted the fly wheel *b* by the studs *c*. To this fly wheel is secured the fixed ring *d* by the long studs *e*. It will be seen that these long studs *e* are provided with suitable shoulders *f* and *g* against which the fly wheel and the fixed disk *d* respectively engage to provide the proper spacing when the parts are bolted together. Between this fixed ring and the fly wheel engage the driving disks *h* and the flexible driven disks *i* provided with clutch facings *j*. The driving disks receive the driving effort from the driving studs *e* on which they are slidably mounted. The flexible driven disks *i* are bolted to the sleeve *k* splined at *m* upon the driven shaft *n*. The advantages and the specific construction of the driving and driven disks are carefully described and claimed in my prior application. Hence I will not enter into details here in connection with this. Furthermore, the construction which this application claims might be used in connection with a different driving and driven disk lay-out.

Figure 1:
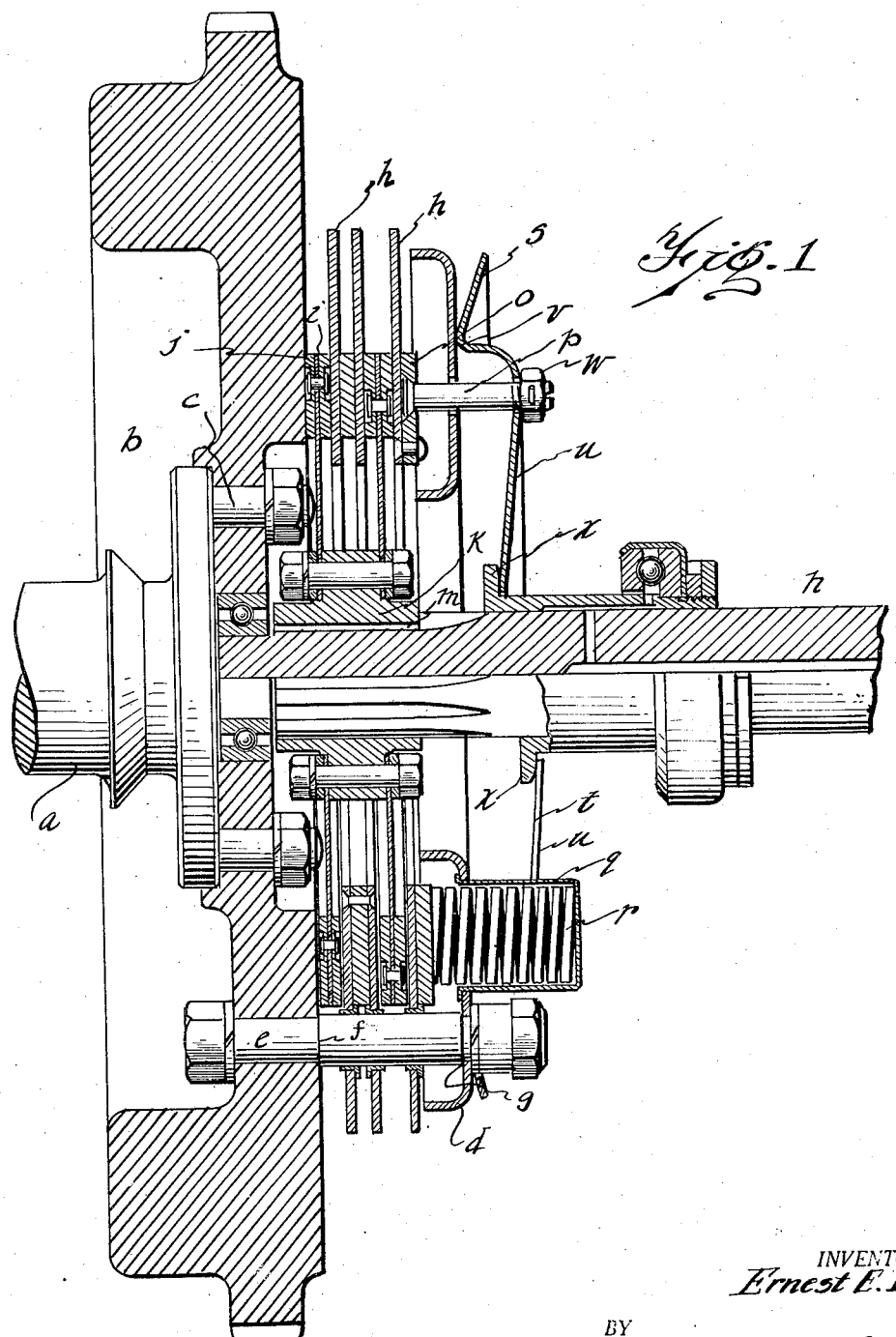
Fig. 1 is a cross section composite in character, the upper half showing the clutch parts engaged and the lower half the clutch parts disengaged.
Figure 2:
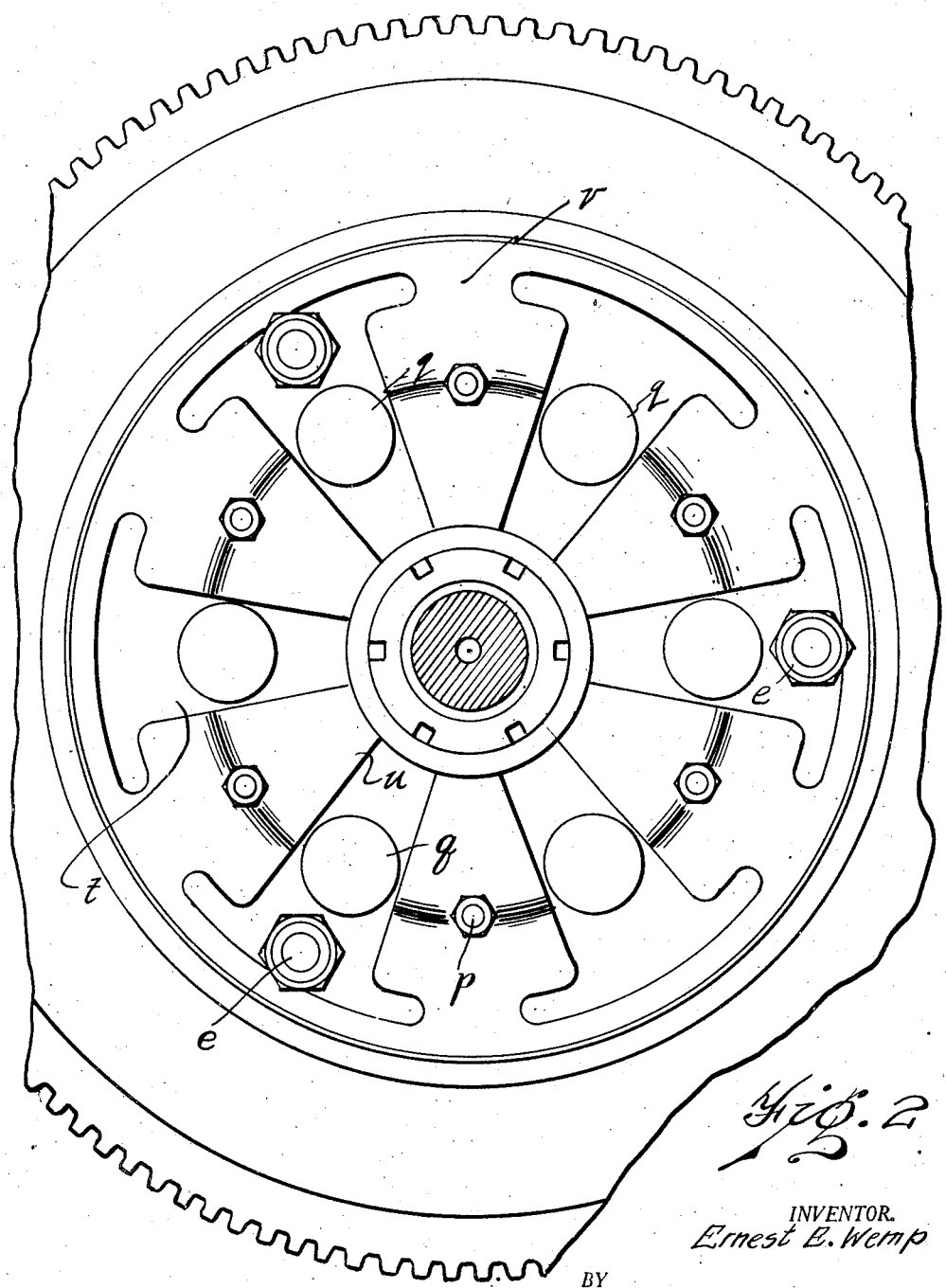
Fig. 2 is a cross section through the driven shaft looking forward at the clutch.

The rear driving disk is riveted to a thrust ring *o* which is bored and countersunk to accommodate the heads of the studs *p*. Either the rear driving disk or the ring *o* can be considered a thrust member such as specified in the claims. These studs pass through openings in the channelled fixed ring *d*. This fixed ring is apertured to receive the spring cups *q* which receive the helical springs *r* that press against the thrust ring *o*. A pressure releasing disk *s* is provided which is almost an exact counterpart of the pressure disk described in my prior application except the disk is simply inverted. This pressure-releasing disk comprises a stamped and tempered concavo-convex disk having a cross section such as shown in Fig. 1 and a plan view such as shown in Fig. 2. The disk is slotted with large radial T slots *t* forming a plurality of levers *u*. These levers fulcrum at *v*, which is the narrow point in the levers that connects with the outer ring portion of the disk. This disk is in effect simply an economical stamping that forms an annulus to properly space, position and fulcrum the levers which are also punched and formed out of the disk blank. These levers *u* receive the load at the points where they engage the nuts *w* on the ends of the studs *p*. They receive the power at the points where they engage the clutch-shifting collar *x*. They are consequently levers of the second order, the load being between the power and the fulcrum.

It will be noted that the rear driving disk, the fixed ring d, the clutch springs and their cups, the release disk, and the releasing studs all form a sub-assembly or unit, said releasing studs serving to bolt the parts together. Spring cups q protrude rearwardly through the slots t in the releasing disk. This affords considerable length for the clutch springs r which are here shown as six in number. There are various advantages that flow from the use of a plurality of direct pressure springs. As most of these advantages are common to all clutches of this type it is unnecessary to enumerate them.

What I claim is:

1. In a clutch, the combination of a driving member, a driven member, driving and driven disks connected with the driving member and the driven member respectively, a fixed ring bolted to and spaced in open relation from the driving member, a thrusting ring, a plurality of coiled springs thrusting toward the driving member to pack the discs and located between the fixed ring and the thrusting ring, and a plurality of levers fulcrumed on the back of the fixed ring and connected with the thrusting ring for releasing the pressure on the disks when desired, by pulling the thrusting ring away from the driving member.

2. In a clutch, the combination of a driving member, a driven member, driving and driven disks secured to the driving member and driven member respectively, an open fixed ring bolted to the driving member in a determined spaced relation, a thrusting member for packing the disks, a plurality of springs engaging between the fixed member and the thrusting member and thrusting toward the driving member to pack the discs, and a plurality of levers fulcrumed on the back of the fixed ring and connected with the thrusting member for releasing the pressure on the disks when desired by pulling the thrusting member away from the driving member.

3. In a clutch, the combination of a driving member, a driven member, a plurality of driving and driven disks secured to the driving member and the driven member respectively, a fixed ring connected to but spaced from the driving member, a thrusting member for packing the disks, a plurality of springs between the fixed ring and the thrusting member for packing the disks, and an annularly corrugated and radially slotted disk engaging the rear of the fixed ring for providing a plurality of levers fulcruming on the fixed ring and connected with the thrust member for releasing the packing pressure.

4. In a clutch, the combination of a driving member, a driven member, a plurality of driving and driven disks connected with the driving member and the driven member respectively, a fixed ring connected with the driving member but spaced therefrom, a thrusting member for packing the disks, a plurality of coiled springs engaging between the fixed member and the thrusting member, a plurality of releasing studs connected with the thrust member and passing through the fixed member, and a flexible disk provided with an annular corrugation and radial slots and forming a plurality of levers of the second order in which the corrugated annular portions fulcrum on the back of the fixed ring and the mid portions of the levers engage with the releasing studs while the inner ends of the levers are arranged to take the power in releasing.

5. In a clutch, the combination of a driving member, a driven member, a plurality of driving and driven disks secured to the driving member and driven member respectively, a plurality of driving studs, an open fixed ring connected to the driving member in spaced relation by the driving studs, a thrusting member, a plurality of helical springs engaging between the fixed ring and the thrusting member and thrusting toward the driving member to pack the discs, a plurality of releasing studs secured to the thrusting member and passing through the fixed ring, and a plurality of levers fulcrumed on the rear of the fixed ring and having intermediate portions engaging the releasing studs for transmitting the releasing effort to the thrust member.

6. In a clutch, the combination of a driving member, a driven member, a plurality of driving and driven disks connected with the driving member and driven member respectively, a fixed ring connected with the driving member but spaced therefrom, said member being provided with openings therethrough, spring cups fitted into said openings, helical springs engaging in said cups, a thrust member engaging said springs and serving to pack the disks, and a flexible radially-slotted and convexo-concaved disk engaging the rear of the fixed ring and providing a plurality of connected levers fulcruming on the rear of the fixed ring and connected with the thrust ring intermediate their ends for releasing the thrust ring when releasing effort is applied at the center of the disk, the said spring cups protruding rearwardly through the radial slots between the lever portions.

In testimony whereof I affix my signature.

ERNEST E. WEMP.